United States Patent
Henry et al.

(10) Patent No.: US 10,383,039 B2
(45) Date of Patent: Aug. 13, 2019

(54) BEST NEXT ACCESS POINT LIST

(71) Applicant: Cisco Technology, Inc., San Jose, CA (US)

(72) Inventors: Jerome Henry, Pittsboro, NC (US); James Frank Florwick, Frederick, MD (US); Allen Joseph Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 162 days.

(21) Appl. No.: 15/255,647

(22) Filed: Sep. 2, 2016

(65) Prior Publication Data

US 2018/0070295 A1    Mar. 8, 2018

(51) Int. Cl.
*H04W 48/16*    (2009.01)
*H04W 36/00*    (2009.01)

(52) U.S. Cl.
CPC ..... *H04W 48/16* (2013.01); *H04W 36/00835* (2018.08)

(58) Field of Classification Search
CPC ..... H04W 48/16; H04W 8/005; H04W 36/28; H04W 36/24
USPC .......................................................... 370/338
See application file for complete search history.

(56) References Cited

U.S. PATENT DOCUMENTS

| | | | |
|---|---|---|---|
| 7,053,830 B2 | 5/2006 | Krumm et al. | |
| 7,821,986 B2 | 10/2010 | Thomson et al. | |
| 8,412,804 B2 | 4/2013 | Polk | |
| 8,665,743 B2 | 4/2014 | Zhu et al. | |
| 8,934,369 B2 | 1/2015 | Cao et al. | |
| 9,648,464 B1 | 5/2017 | Tran et al. | |
| 2007/0025339 A1 | 2/2007 | Polk | |
| 2007/0032241 A1* | 2/2007 | Busch | H04B 7/022 455/450 |
| 2007/0149216 A1 | 6/2007 | Misikangas | |
| 2007/0280152 A1 | 12/2007 | Thomson et al. | |
| 2009/0067392 A1 | 3/2009 | Hart et al. | |
| 2012/0050108 A1 | 3/2012 | Whiting et al. | |
| 2012/0270573 A1 | 10/2012 | Marti et al. | |
| 2013/0107728 A1 | 5/2013 | Zhu et al. | |
| 2013/0165144 A1 | 6/2013 | Ziskind et al. | |
| 2014/0098682 A1 | 4/2014 | Cao et al. | |
| 2014/0113631 A1* | 4/2014 | Zhou | H04W 72/10 455/436 |

(Continued)

*Primary Examiner* — Mark H Rinehart
*Assistant Examiner* — Kokou R Detse
(74) *Attorney, Agent, or Firm* — Merchant & Gould P.C.

(57) ABSTRACT

For each one of a plurality of subsequent access points, a respective quantity of client devices that roam from a current access point to each of the respective plurality of subsequent access points may be determined. Then, for each one of the plurality of subsequent access points based on the determined quantity of client devices that roam from the current access point to each of the plurality of subsequent access points, a corresponding respective weight indicating a likelihood of its respective corresponding one of the plurality of subsequent access points being roamed to may be determined. Next, a table may be created indicating the desirability of at least a portion of the plurality of subsequent access points to be roamed to based upon the corresponding respective weight of the plurality of subsequent access points indicated in the table. The current access point may be provided with the table.

20 Claims, 4 Drawing Sheets

(56) References Cited

U.S. PATENT DOCUMENTS

2014/0171069 A1\* 6/2014 Pang ................. H04W 36/0083
                                                        455/432.1
2016/0112942 A1\* 4/2016 Chang ................... H04W 48/20
                                                          455/434

\* cited by examiner

BEST NEXT ACCESS POINT LIST

TECHNICAL FIELD

The present disclosure relates generally to access points, in particular to lists indicating next best access points.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the WAP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

For each one of a plurality of subsequent access points, a respective quantity of client devices that roam from a current access point to each of the respective plurality of subsequent access points may be determined. Then, for each one of the plurality of subsequent access points based on the determined quantity of client devices that roam from the current access point to each of the plurality of subsequent access points, a corresponding respective weight indicating a likelihood of its respective corresponding one of the plurality of subsequent access points being roamed to may be determined. Next, a table may be created indicating the desirability of at least a portion of the plurality of subsequent access points to be roamed to based upon the corresponding respective weight of the plurality of subsequent access points indicated in the table. The current access point may be provided with the table.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Wireless standards may include a feature that may enable a wireless local area network (WLAN) infrastructure to provide a list (i.e., neighbor list) of possible best next access points (APs) that a wireless client of the WLAN can evaluate while roaming. For example, a list of 6 "loudest" (in theory "nearest") neighbor APs may be provided to a current AP. Although it may be true that next hop APs are neighbors to the current AP, not all next hop APs may be ideal roaming candidates. For example, in any "canyon scenario", (constrained physical path traversed by the user with a client device), APs that are closely spaced/clustered may be neighbors, but may not be ideal roaming candidates (i.e., best next APs). For example, in retail, as a user enters the store, the APs immediately above the user may be APs clustered over a cash register checkout line. However, since these APs may be closely grouped, the user may never roam directly to those when the user latter enters merchandise aisles. In the merchandise aisles, the APs above the user may hear an AP two aisles away (e.g., clear line of sight from the ceiling), but the user may never directly and physically cross through the shelves to roam to that location aisles away. This same canyon scenario may happen in warehouses, shopping malls, stores, museums, convention centers, etc. In short, the canyon scenario may happen in all scenarios where the roaming path of the user at the floor level is different from the unobstructed view at the ceiling level.

Similarly, APs that are too far apart from each other may be "neighbors", but may not be roaming candidates (e.g., next best APs). The user's client device may jump to another AP before getting in range (e.g. good signal) from that far away neighbor. Also, APs may hear each other at a low level or not at all, but may still be roaming candidates (e.g., an AP around a corner, after an elevator bank obstructing direct AP-to-AP signal).

These situations may result in a less than ideal use of the list of possible best next APs (i.e., neighbor list feature) provided by wireless standards. Consequently, some WLAN deployments may disable this feature because it may provide a neighbor list that may not be useable. In other deployments where the neighbor list feature may be enabled, client devices may attempt to use the neighbor list, but then do not find usable APs and then undergo a full scan of all APs thus defeating the purpose of the neighbor list. A full scan not only is battery-intensive, but may be disruptive for the client device (e.g., time consumption resulting in poor user experience, especially for real time applications; temporary loss of connection). A full scan may also be a source of noise for neighboring APs on other channels, especially in high density environments.

Embodiments of the disclosure may use light, but efficient roaming analytics to optimize the neighbor list returned to each client device thus providing an efficient "next best AP" list (e.g., neighbor list). The roaming analytics may leverage Angle of Approach (AoA) and a signal+load weighting mechanism as described in greater detail below.

A current AP can send, to a Wi-Fi client device, a neighbor list listing the best neighboring AP channels and characteristics for that current AP. This neighbor list can be used as "next best AP" to roam to for a client device on the current AP. Neighbor lists may be sent by a current AP to a client device, for example, when the client device associates with the current AP and when the client device moves toward an edge of a cell corresponding to the current AP. Details about a number (e.g., 6) of loudest APs as heard by the reporting AP may be sent to the client device. Embodiments of the disclosure may enhance the neighbor list to integrate other network dependent variables and neighboring AP conditions that may affect and improve client device roaming decisions. Embodiments of the disclosure may store AP neighbors by creating tuples [Neighbor, weight], where the weight represents the likelihood of the target neighbor (e.g., a subsequent access point) to be a roaming destination for client devices of the current AP.

Consistent with embodiments of the disclosure, the current AP may consider the received signal strength indicator (RSSI) values of neighboring APs (e.g., subsequent access points) to initially populate the neighbor list. In other embodiments of the disclosure, the current AP may also consider additional parameters, for example, AoA, and/or neighboring AP load (over time) to assist or influence neighbor list construction (self-modifying or adaptive neighbor list). AP load histogram may also be used in other processes, for example, to increase efficiency by adding a load contribution element.

When considering AoA, for example, an AP neighbor list may be created for each AP in the system based on AoA (i.e., directionality) of heard neighbors. This may be parsed into quadrants where the system may assign neighboring APs to a quadrant corresponding to the direction the AP was heard in. While quadrants may be used, any number of sections may be used and embodiments of the disclosure are not limited to quadrants. When using the AoA, each AP may measure directionality of signals received from client devices and the system may use that information to refine its evaluation of APs. In the example of quadrants, AP may choose and transmit from 1 of 4 possible neighbor lists when advising a client device.

A controller may log client devices that associate to an AP, then re-associate (roam) to another AP. The controller may record which AP client devices roam to (this can be a simple roamed-client count per neighboring AP) and may create associated roaming vectors. This may help build a history or memory of roaming because the path the client devices traverse may not be random or arbitrary. Privacy may be maintained because individual client device media access control (MAC) addresses may not be recorded beyond cell-to-cell movement, and only a count may be kept.

Client devices may roam to APs that the current AP does not detect (e.g., no radio line of sight from the APs perspective, while the client device roaming path allows for such a roaming pattern). In this example, a subsequent AP may be down a hall and around a corner from the current AP where walls may block radio signals between the subsequent AP and the current AP. Because client devices may consistently roam from the current AP to this subsequent AP that is around the corner from the current AP, the controller may include this subsequent AP in the neighbors list for the current AP even though the current AP has no radio line of sight to the subsequent AP. In other words, in this case, the current AP may learn about the neighboring subsequent AP from the controller by the neighbor list. Furthermore, both APs may communicate through their wire interface or both APs may communicate with a central point, for example, the controller (e.g., WLAN controller) in charge of configuring some APs parameters from a central point.

Figure 1:
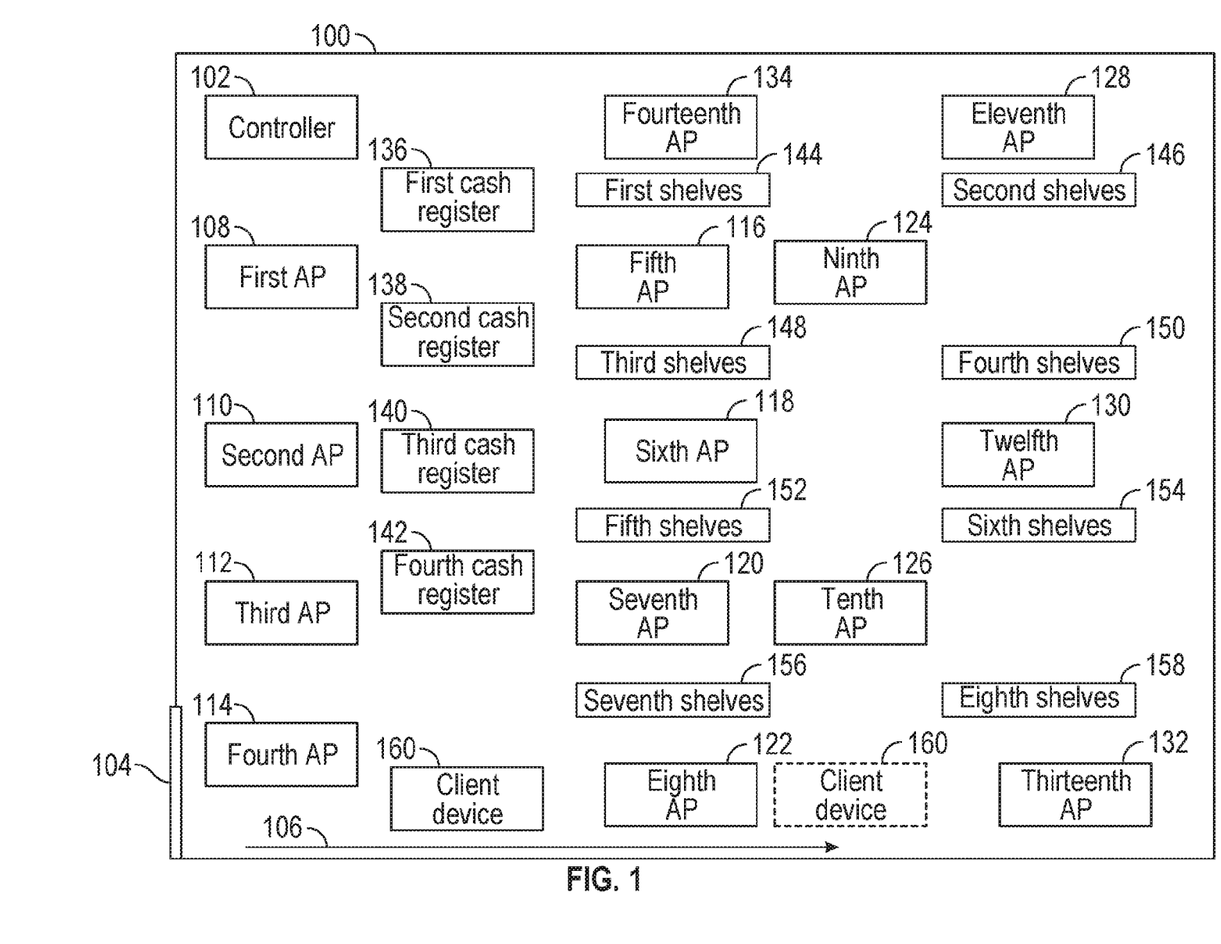
FIG. 1 shows a system for providing a best next access point list.

Consistent with embodiments of the disclosure, the next best access point for a given client device may be spread in a peer-to-peer manner by client devices. For example, a good next access point for a given device may not be under the control of controller 102, so controller 102 may not be aware of it. Because the good next access point for the given device may not be under the control of controller 102, the good next access point may be considered a "non-native" access point. The good next access point (e.g., non-native) may be under the control of another controller or may just be a single access point. Near-me Area Network (NAN), WiFi, or Bluetooth Low Energy (BLE), for example, may be used by the client devices (e.g., a first client device and a second client device) to make each other directly aware and discover the existence of a good next access point in a peer-to-peer manner. The existence of this non-native good next access point may be sent to controller 102 even though this access point is not under the control of controller 102. Controller 102 may incorporate access points found in this manner in its neighbor lists.

FIG. 1 shows an operating environment 100 consistent with embodiments of the disclosure for providing a best next access point list. For example, operating environment 100 may illustrate a retail store floor plan. As shown in FIG. 1, operating environment 100 may comprise a controller 102, an entrance/exit 104, a client device user path 106, a plurality of access points, a plurality of cash registers, and a plurality of shelves. The plurality of access points may comprise a first access point 108, a second access point 110, a third access point 112, a fourth access point 114, a fifth access point 116, a sixth access point 118, a seventh access point 120, an eight access point 122, a ninth access point 124, a tenth access point 126, an eleventh access point 128, a twelfth access point 130, a thirteenth access point 132, and a fourteenth access point 134. The plurality of cash registers may comprise a first cash register 136, a second cash register 138, a third cash register 140, and a fourth cash register 142. The plurality of shelves may comprise a first shelves 144, a second shelves 146, a third shelves 148, fourth shelves 150, a fifth shelves 152, a sixth shelves 154, a seventh shelves 156, and an eighth shelves 158. Operating environment 100 may further include a client device 160. Client device 160 may comprise, but is not limited to, a tablet device, a mobile device, a smart phone, a telephone, a remote control device, a personal computer, a network computer, or other similar device capable of accessing and using the WLAN.

Controller 102 may access and control the plurality of access points in order to provide client devices (e.g., client device 160) roaming within operating environment 100 with a WLAN. The plurality of access points may be placed in a ceiling of operating environment 100. Because the plurality of shelves may create a constrained physical path traversed by the user with client device 160, the aforementioned "canyon scenario" may exist in operating environment 100.

As shown in FIG. 1, the user of client device 160 may enter entrance/exit 104 of operating environment 100 and client device 160 may access the WLAN through fourth access point 114. The user may continue through operating environment 100 along client device user path 106. Given the route of client device user path 106 that the user is taking through operating environment 100, even though third access point 112 may be louder (e.g., RSSI wise) from the perspective of fourth access point 114, eighth access point 122 may be better for client device 160 to access next when roaming beyond the range of fourth access point 114. Similarly, as the user with client device 160 continues down client device user path 106, client device may disassociate from fourth access point 114 and associate to eighth access point 122. As the user device leaves the area associated with eighth access point 122, even though fourth access point 114 and seventh access point 122 may be loader (e.g., RSSI wise), thirteenth access point 132 or tenth access point 126 may be better for client device 160 as it continues along the merchandise aisles between the plurality of shelves in operating environment 100. Embodiments of the disclosure may create and provide neighbor lists that can be used to help identify the next best AP to roam to for a client device as the client device roams in a canyon scenario.

At the initial boot time for controller 102 and the plurality of access points, each of the plurality of access points may begin to hear each of their neighboring access points within the plurality of access points. However, not enough client devices have roamed about within operating environment 100 to support the differentiated weighting process described below. Consequently, each of the plurality of access points reports to controller 102 the RSSI of each of its neighboring access points that it hears. Then, for each on the plurality of access points, the controller may create a respective neighbor list ranking each access point's neighboring access points based on RSSI strength. The neighbor list may include all heard neighboring access points or may comprise just a predetermined number (e.g., 6) of the strongest. Controller 102 may provide, to each of the plurality of access points, each respective access point's neighbor list in the form of a table that may include the aforementioned tuples. In this initial phase, all weights may be set the same in the tuples.

Figure 2:
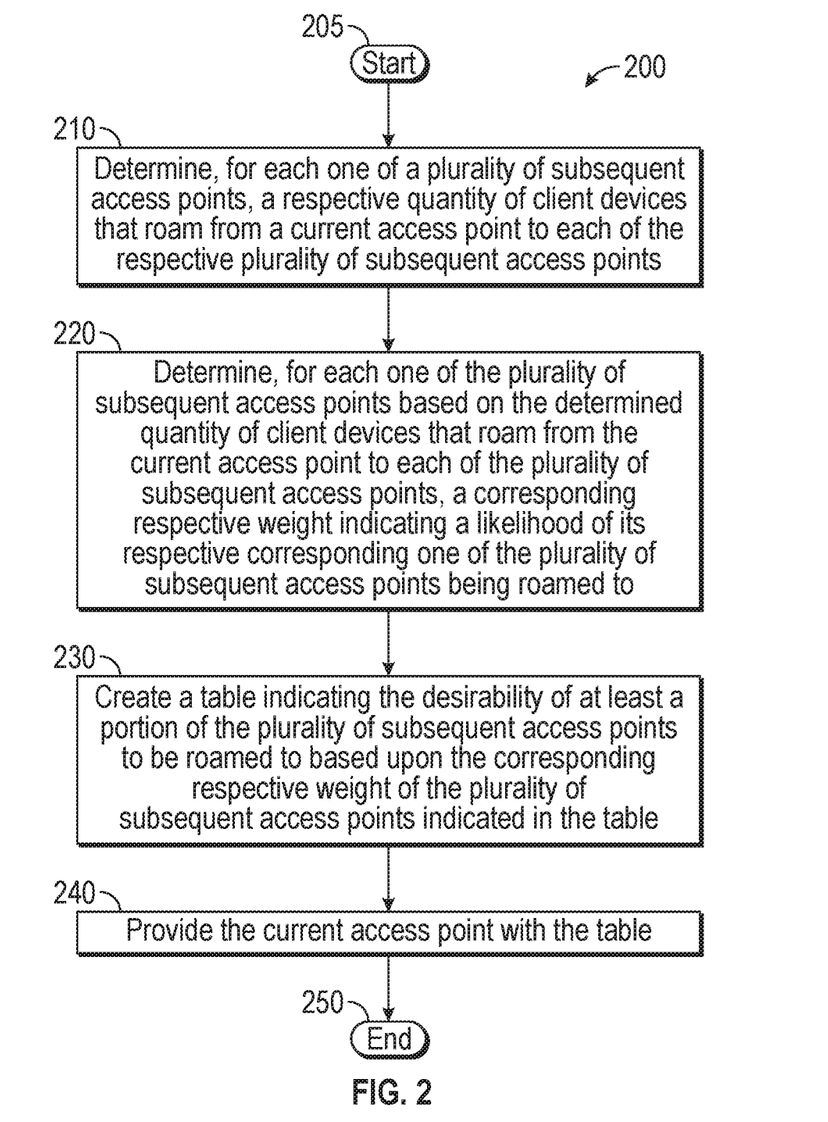
FIG. 2 is a flow chart of a method for providing a best next access point list.

FIG. 2 is a flow chart setting forth the general stages involved in a method 200 consistent with an embodiment of the disclosure for providing a best next AP list (i.e., neighbor list). Method 200 may be implemented using controller 102 as described in more detail above with respect to FIG. 1. Ways to implement the stages of method 200 will be described in greater detail below.

Method 200 may begin at starting block 205 and proceed to stage 210 where controller 102 may determine, for each one of a plurality of subsequent access points, a respective quantity of client devices that roam from a current access point to each of the respective plurality of subsequent access points. The plurality of subsequent access points may be a subset of the plurality of access points. For example, controller 102 may log client devices that associate to a one of the plurality of access points (e.g., the current access point) and then re-associate (roam) to another one of the plurality of access points (e.g., subsequent access point). Embodiments of the disclosure may use the aforementioned evenly weighted neighbor lists based on RSSI until a requisite number of client devices (e.g., a first threshold) roam to and away from an access point. The requisite number may comprise, but is not limited to, 3 for each access point.

From stage 210, where controller 102 determines the respective quantity of client devices, method 200 may advance to stage 220 where controller 102 may determine, for each one of the plurality of subsequent access points based on the determined quantity of client devices that roam from the current access point to each of the plurality of subsequent access points, a corresponding respective weight indicating a likelihood of its respective corresponding one of the plurality of subsequent access points being roamed to. For example, when the number of client devices roaming away from an access point (e.g., the current access point) exceeds the first threshold value, controller 102 may apply differentiated weighting based on where the client devices roamed away to. Embodiments of the disclosure may wait until the first threshold value is exceeded so that a trend may develop.

As shown in FIG. 1, users with client devices may enter entrance/exit 104. As the users enter entrance/exit 104, their client devices may associate with fourth access point 114. Over time, after a large number of client devices have roamed through operating environment 100, controller may log that 5% of client devices that leave fourth access point 114 reassociate to third access point 112, 15% of client devices that leave fourth access point 114 reassociate to seventh access point 120, and 80% of client devices that leave fourth access point 114 reassociate to eighth access point 122. Furthermore, regarding eight access point 122, controller 102 may log over time that 60% of client devices that leave eighth access point 122 reassociate to thirteenth access point 132, 20% reassociate to tenth access point 126, 5% reassociate to seventh access point 120, 10% reassociate to fourth access point 114, and 5% reassociate to third access point 112. Table 1 illustrates the aforementioned reassociation activities with respect to eighth access point 122.

TABLE 1

| Current AP Eighth AP 122 | Thirteenth AP 132 | Tenth AP 126 | Seventh AP 120 | Fourth AP 114 | Third AP 112 | Total |
|---|---|---|---|---|---|---|
| | 60% | 20% | 5% | 10% | 5% | 100% |

Furthermore, embodiments of the disclosure may take a more granular approach when logging how client devices roam in operating environment 100 and traverse through the cell of a particular current access point on its way to reassociating to a subsequent access point. Embodiments of the disclosure may use AoA to organize clients by sections of a traversed access point and base the list of neighboring access points based on where clients from a particular section roamed to. At one granular level, embodiments of the disclosure may consider which section of the current access point the client devices roamed from.

Figure 3:
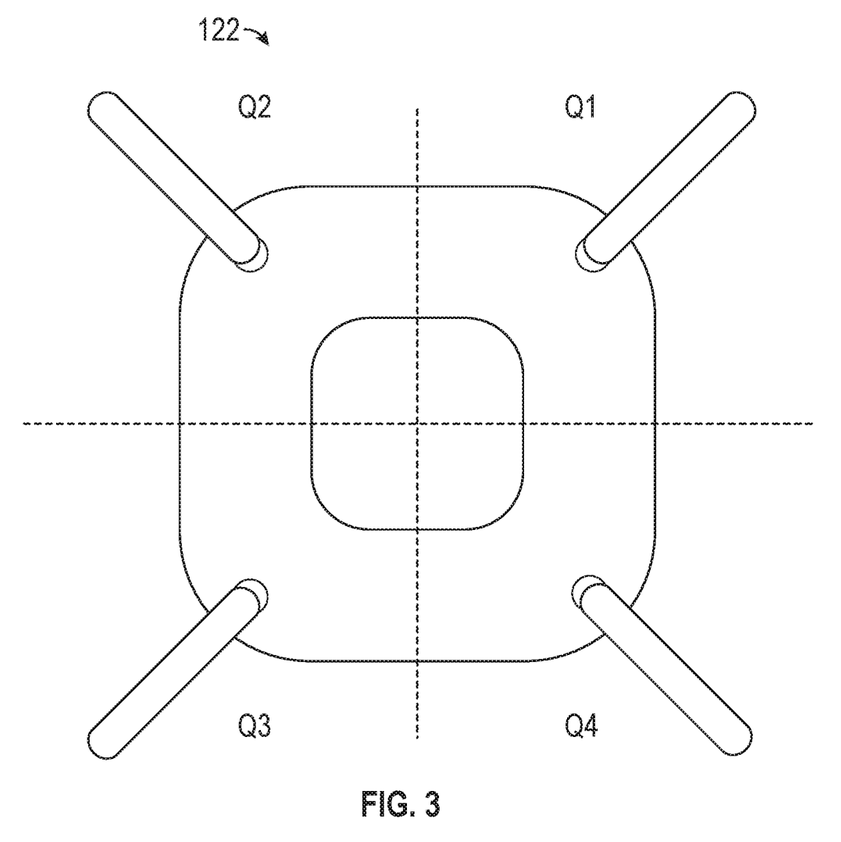
FIG. 3 shows an access point in quadrants.

FIG. 3 illustrates eighth access point 122 being partitioned in to sections, in this example, quadrants, Q1, Q2, Q3, and Q4. Embodiments of the disclosure may use any number of sections and is not limited to quadrants. Furthermore, all of the plurality of access point may be partitioned into section. Using this section approach, not only does controller 102 log that a client device disassociated from a current access point on its way to reassociate with a subsequent access point, but also logs which section of the current access point that the client device roamed away from in going to the subsequent access point to reassociate. Controller 102 may also log which section the client device approached the subsequent access point when it reassociated to the subsequent access point.

Continuing the example above with respect to Table 1 above, Table 2 illustrates the aforementioned reassociation activities with respect to eighth access point 122 when the more granular sectional departure approach is used. In this way a neighbor list for eighth access point 122 may be provided by controller 102 not only for the next best neighbors, but it can be fine-tuned for the next best neighbors based on how the client device roamed away from (e.g., which section the client device roamed away from) the current access point, in this example, eighth access point 122.

TABLE 2

| Current AP Eighth AP 122 Exit | Thirteenth AP 132 | Tenth AP 126 | Seventh AP 120 | Fourth AP 114 | Third AP 112 | Total |
|---|---|---|---|---|---|---|
| Q1 | 5% | 18% | 0% | 0% | 5% | 28% |
| Q2 | 0% | 0% | 5% | 3% | 0% | 8% |
| Q3 | 0% | 0% | 0% | 7% | 0% | 7% |
| Q4 | 55% | 2% | 0% | 0% | 0% | 57% |
| Total | 60% | 20% | 5% | 10% | 5% | 100% |

As shown in Table 2, for those roaming away from Q1 of eighth access point 122, 5% went to thirteenth access point 132, 18% went to tenth access point 126, and 5% went to third access point 112. For those roaming away from Q2 of eighth access point 122, 5% went to seventh access point 120 and 3% went to fourth access point 114. For those roaming away from Q3 of eighth access point 122, 7% went to fourth access point 114. And for those roaming away from Q4 of eighth access point 122, 55% went to thirteenth access point 132 and 2% went to tenth access point 126.

Continuing the example above with respect to Table 1 and Table 2 above, Table 3 illustrates the aforementioned reassociation activities with respect to eighth access point 122 when an even more granular vector departure approach is used. In this way, a neighbor list for eighth access point 122 may be provided not only for the next best neighbors, but it can be fine-tuned for the next best neighbors based on how the client device roamed to and away (e.g., vector) from (e.g., which section the client device roamed to the current access point and which section the client device roamed away from) the current access point, in this example, eighth access point 122.

TABLE 3

| Current AP Eighth AP 122 Enter | Exit | Thirteenth AP 132 | Tenth AP 126 | Seventh AP 120 | Fourth AP 114 | Third AP 112 | Total |
|---|---|---|---|---|---|---|---|
| Q1 | Q2 | 0% | 0% | 2% | 1% | 3% | 6% |
| Q1 | Q3 | 0% | 0% | 0% | 5% | 0% | 5% |
| Q1 | Q4 | 0% | 0% | 0% | 0% | 0% | 0% |
| Q2 | Q1 | 2% | 16% | 0% | 0% | 0% | 18% |
| Q2 | Q3 | 0% | 0% | 0% | 0% | 0% | 0% |
| Q2 | Q4 | 2% | 1% | 0% | 0% | 0% | 3% |
| Q3 | Q1 | 3% | 2% | 0% | 0% | 0% | 5% |
| Q3 | Q2 | 0% | 0% | 0% | 0% | 0% | 0% |
| Q3 | Q4 | 53% | 1% | 0% | 0% | 0% | 54% |
| Q4 | Q1 | 0% | 0% | 0% | 0% | 0% | 0% |

TABLE 3-continued

| Current AP Eighth AP 122 Enter | Exit | Thirteenth AP 132 | Tenth AP 126 | Seventh AP 120 | Fourth AP 114 | Third AP 112 | Total |
|---|---|---|---|---|---|---|---|
| Q4 | Q2 | 0% | 0% | 3% | 2% | 2% | 7% |
| Q4 | Q3 | 0% | 0% | 0% | 2% | 0% | 2% |
| Total | | 60% | 20% | 5% | 10% | 5% | 100% |

As shown in Table 3, in addition to which section of the current access point a device roams away from, the section into which the client device roamed into the current access point as it associated with the current access point is considered as well. This provides even higher accuracy when trying to predict where an associated client device may roam to next.

In addition to where the client devices roamed away to, the differentiated weighting may also be based on neighboring access point loads. For example, an access point heavily loaded may be a less worthy candidate than an access point with a lower load. Loads may be averaged over time to avoid anomalies due to temporary bursts. Accordingly, the differentiated weighting process may be designed that can take three elements into account: neighbor RSSI; quantity of client devices that roamed away to a particular neighbor access point; and neighbor access point neighbor load/channel utilization. In addition, the weights may be administrator configurable to allow an administrator to change the weight model based on the operating environment (e.g., canyon verses open space, potential for flash mobs, etc.).

Consistent with embodiments of the disclosure, the weight assigned to a given neighboring access point may be formed by using one of more of its RSSI, its load, and the percentage of client devices that associated to that neighboring access point after leaving the current access point. Additional parameters may be integrated into this as well. For example, a manual BIAS to account for design decisions. Another example may be a timer. As client devices may not roam optimally (roaming to an access point that may not be optimally on the roaming path, before roaming again, this time to an access point on the path). The additional timer could be added to include or exclude temporary access points. The timer could also evaluate the client device activity (traffic instead of time).

Once controller 102 determines the corresponding respective weight in stage 220, method 200 may continue to stage 230 where controller 102 may create a table (i.e., neighbor list) indicating the desirability of at least a portion of the plurality of subsequent access points to be roamed to based upon the corresponding respective weight of the plurality of subsequent access points indicated in the table.

TABLE 4

| Neighbor | Weight |
|---|---|
| Thirteenth AP 132 | 60 |
| Tenth AP 126 | 20 |
| Seventh AP 120 | 5 |
| Fourth AP 114 | 10 |
| Third AP 112 | 5 |

When AoA is not considered, the above example of Table 1 may produce a neighbor list as shown in Table 4.

TABLE 5

| Current AP Exit Quadrant | Neighbor | Weight |
| --- | --- | --- |
| Exit Q4 | Thirteenth AP 132 | 55 |
| Exit Q1 | Tenth AP 126 | 18 |
| Exit Q3 | Fourth AP 114 | 7 |
| Exit Q1 | Thirteenth AP 132 | 5 |
| Exit Q1 | Third AP 112 | 5 |
| Exit Q2 | Seventh AP 120 | 5 |

When AoA is considered, the above example of Table 2 may produce a neighbor list as shown in Table 5. Table 5 illustrates the aforementioned reassociation activities with respect to eighth access point 122 when the more granular sectional departure (e.g., exit) approach is used. While controller 102 may calculate weights for other exit quadrants and subsequent access points, it may only place a certain number of the highest weights, in this example, 6.

TABLE 6

| Current AP Enter/ Exit Quadrant | Neighbor | Weight |
| --- | --- | --- |
| Enter Q3 - Exit Q4 | Thirteenth AP 132 | 53 |
| Enter Q2 - Exit Q1 | Tenth AP 126 | 16 |
| Enter Q1 - Exit Q3 | Fourth AP 114 | 5 |
| Enter Q4 - Exit Q2 | Seventh AP 120 | 3 |
| Enter Q1 - Exit Q2 | Third AP 112 | 3 |
| Enter Q4 - Exit Q2 | Fourth AP 114 | 2 |

When the even more granular vector departure approach is used, as illustrated in the Table 3 example, a neighbor list as shown in Table 6 may result. Again, while controller 102 may calculate weights for other enter/exit quadrants and subsequent access points, it may only place a certain number of the highest weights, in this example, 6. Again, the differentiated weight assigned in Table 4, Table, 5, and Table 6 may not only consider the percentage of client devices that associated to that neighboring access point after leaving the current access point, but may also consider the neighbors' RSSI and load for example.

After controller 102 creates the table in stage 230, method 200 may proceed to stage 240 where controller 102 may provide the current access point with the table (i.e., neighbor list). For example, controller 102 may provide any of the tables illustrated in Table 4, Table 5, or Table 6 to eighth access point 122. As the user of client device 160 moves along user path 106, client device 160 may disassociate with fourth access point 114 and associate with eighth access point 122. Eighth access point 122 may send the table (e.g., neighbor list) to client device 160 when client device 160 first associates with eighth access point 122. Or eighth access point 122 may send the table (e.g., neighbor list) to client device 160 when client device 160 moves toward an edge of a cell corresponding to eighth access point 122. The edge of the cell can be determined statically (e.g., client signal is less than −68 dBm), or dynamically (edge of the cell is 10 dB higher than the average signal of previous client that left the cell, measuring the last x frames received from these previous clients before roaming). The history of previous roams of other client devices may be used to learn and create likely roaming patterns. Accordingly, client device 160 may be provided with a neighbor list that may match a list of candidate subsequent access points that client device 160 may be most likely to want to roam to. Once controller 102 provides the current access point with the table in stage 240, method 200 may then end at stage 250.

The constrained physical paths traversed by users with client devices in operating environment 100 may change from time to time. For example, the plurality of shelves may be rearranged or new shelves may be added. As a result, the neighbor lists provided by controller 102 to the plurality of access point by controller 102 may no longer be accurate. Consistent with embodiments of the disclosure, the system may be reset and the process described by method 200 above may be repeated to produce accurate neighbor lists for the plurality of access point based on the rearranged operating environment. The process described by method 200 may be continuously repeated to take into account any changes in operating environment 100. Furthermore, weights may be used to rate higher recent patterns over older patterns.

Figure 4:
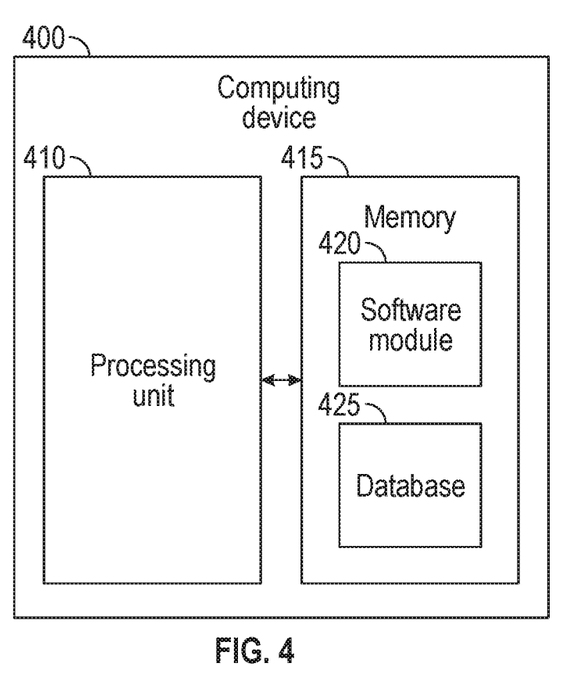
FIG. 4 shows a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform processes for providing localization of group based policies in a demand based overlay network, including for example, any one or more of the stages from method 200 described above with respect to FIG. 2. Computing device 400, for example, may provide an operating environment for controller 102 or any of the plurality of access points. Controller 102 and the plurality of access points may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 400 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. Furthermore, computing device 400 may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, for each one of a plurality of subsequent access points, a respective quantity of client devices that roam from predetermined sections of a current access point to each of the respective plurality of subsequent access points;
   determining, for each one of the plurality of subsequent access points based on the determined quantity of client devices that roam from the predetermined sections of the current access point to each of the plurality of subsequent access points, a corresponding respective weight indicating a likelihood of its respective corresponding one of the plurality of subsequent access points being roamed to, wherein determining the respective weight comprises:
      parsing the plurality of subsequent access points into one of a plurality of quadrants based on an angle of approach from the current access point, and
      determining the respective weight based on a quantity of client devices traversed from the current access point in each of the plurality of quadrants;
   creating a table indicating the desirability of at least a portion of the plurality of subsequent access points to be roamed to based upon the corresponding respective weight of the plurality of subsequent access points indicated in the table; and
   providing the current access point with the table.

2. The method of claim 1, further comprising identifying the plurality of subsequent access points based on received signal strength indicator (RSSI) values received by the current access point from each of the plurality of subsequent access points.

3. The method of claim 1, wherein determining, for each one of the plurality of subsequent access points, the respective quantity of client devices that roam from predetermined sections of the current access point to each of the respective plurality of subsequent access points comprises determining the respective quantity of client devices that roam from predetermined sections of the current access point to each of the respective plurality of subsequent access points wherein at least one of the plurality of subsequent access points does not have a radio line of sight to the current access point.

4. The method of claim 1, wherein determining, for each one of the plurality of subsequent access points based on the determined quantity of client devices that roam from predetermined sections of the current access point to each of the plurality of subsequent access points, the corresponding respective weight comprises determining the corresponding respective weight also based on loads for each one of the plurality of subsequent access points.

5. The method of claim 1, wherein determining, for each one of the plurality of subsequent access points based on the determined quantity of client devices that roam from predetermined sections of the current access point to each of the plurality of subsequent access points, the corresponding respective weight comprises determining the corresponding respective weight also based on received signal strength indicator (RSSI) values for each one of the plurality of subsequent access points.

6. The method of claim 1, further comprising providing, by the current access point, the table to a client device.

7. The method of claim 1, further comprising providing, by the current access point, the table to a client device when the client device first associates with the current access point.

8. The method of claim 1, further comprising providing, by the current access point, the table to a client device when the client device moves toward an edge of a cell corresponding to the current access point.

9. The method of claim 1, further comprising providing, by the current access point, the table to a client device when the client device moves toward an edge of a cell corresponding to the current access point, the edge of the cell being 10 dB higher than the average signal of previous client that left the cell.

10. The method of claim 1, further comprising providing, by the current access point, the table to a client device when a signal from the client device is less than −68 dBm.

11. The method of claim 1, wherein creating the table comprises creating the table indicating the desirability of a non-native access point to be roamed to based upon discovering the existence of the non-native access point from a first client device that discovered the non-native access point from a second client device in a peer-to-peer manner.

12. A method comprising:
  determining, for each one of a plurality of subsequent access points, a respective quantity of client devices that roam into predetermined sections and from the predetermined sections of a current access point to each of the respective plurality of subsequent access points;
  determining, for each one of the plurality of subsequent access points based on the determined quantity of client devices that roam into the predetermined sections and from the predetermined sections of the current access point to each of the plurality of subsequent access points, a corresponding respective weight indicating a likelihood of its respective corresponding one of the plurality of subsequent access points being roamed to, wherein determining the respective weight comprises:
    parsing the plurality of subsequent access points into one of a plurality of quadrants based on an angle of approach from the current access point, and
    determining the respective weight based on a quantity of client devices traversed from the current access point in each of the plurality of quadrants;
  creating a table indicating the desirability of at least a portion of the plurality of subsequent access points to be roamed to based upon the corresponding respective weight of the plurality of subsequent access points indicated in the table; and
  providing the current access point with the table.

13. The method of claim 12, further comprising providing, by the current access point, the table to a client device when the client device first associates with the current access point.

14. The method of claim 12, further comprising providing, by the current access point, the table to a client device when the client device moves toward an edge of a cell corresponding to the current access point.

15. The method of claim 12, further comprising providing, by the current access point, the table to a client device when the client device moves toward an edge of a cell corresponding to the current access point, the edge of the cell being 10 dB higher than the average signal of previous client that left the cell.

16. An apparatus comprising:
  a memory storage; and
  a processing unit coupled to the memory storage, wherein the processing unit is operative to:
    determine, for each one of a plurality of subsequent access points, a respective quantity of client devices that roam through a current access point on given vectors into predetermined sections of the current access point and from the predetermined sections of the current access point to each of the respective plurality of subsequent access points;
    determine, for each one of the plurality of subsequent access points based on the determined quantity of client devices that roam through the current access point on the given vectors into the predetermined sections of the current access point and from the predetermined sections of the current access point to each of the plurality of subsequent access points, a corresponding respective weight indicating a likelihood of its respective corresponding one of the plurality of subsequent access points being roamed to, wherein the processing unit being operative to determine he respective weight comprises the processing unit being operative to:
      parse the plurality of subsequent access points into one of a plurality of quadrants based on an angle of approach from the current access point, and
      determine the respective weight based on a quantity of client devices traversed from the current access point in each of the plurality of quadrants;
    create a table indicating the desirability of at least a portion of the plurality of subsequent access points to be roamed to based upon the corresponding respective weight of the plurality of subsequent access points indicated in the table; and
    provide the current access point with the table.

17. The apparatus of claim 16, wherein the processing unit is further operative to identify the plurality of subsequent access points based on received signal strength indicator (RSSI) values received by the current access point from each of the plurality of subsequent access points.

18. The apparatus of claim 16, wherein the processing unit being operative to determine the corresponding respective weight comprises the processing unit being operative to determine the corresponding respective weight also based on loads for each one of the plurality of subsequent access points.

19. The apparatus of claim 16, wherein the processing unit being operative to determine the corresponding respective weight comprises the processing unit being operative to determine the corresponding respective weight also based on received signal strength indicator (RSSI) values for each one of the plurality of subsequent access points.

20. The apparatus of claim 16, wherein the plurality of subsequent access points and the current access point are disposed in a ceiling of an operating environment and a floor of the operating environment has constrained physical path configured to be traversed by a user with a client device.

* * * * *